Oct. 22, 1963
O. S. CAESAR
3,107,423
ELECTRIC SHAVERS
Filed March 27, 1959
5 Sheets-Sheet 1
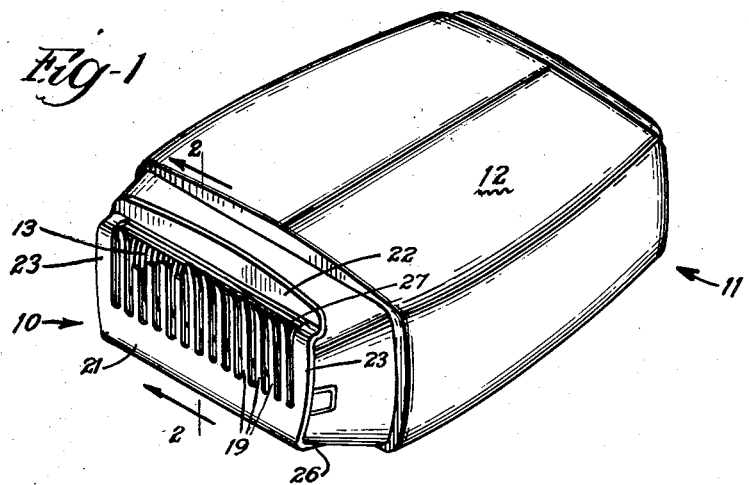
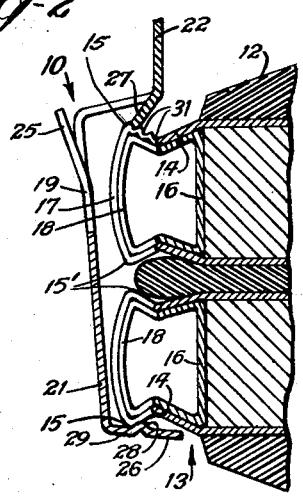
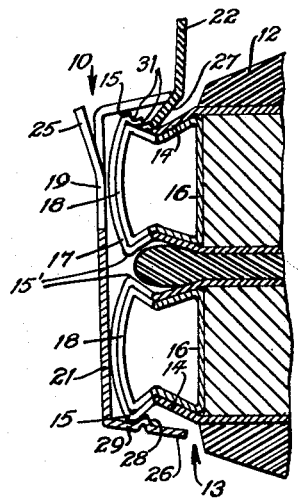
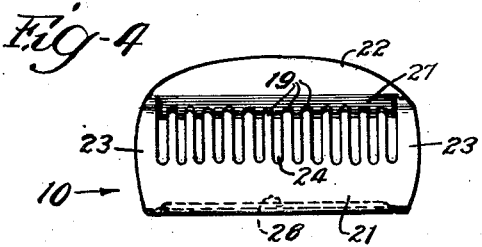
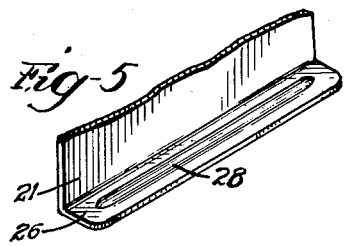
INVENTOR.
Orville S. Caesar
BY
Brown, Jackson, Boettcher & Dienner
Attys.

Oct. 22, 1963 — O. S. CAESAR — 3,107,423
ELECTRIC SHAVERS
Filed March 27, 1959 — 5 Sheets-Sheet 2
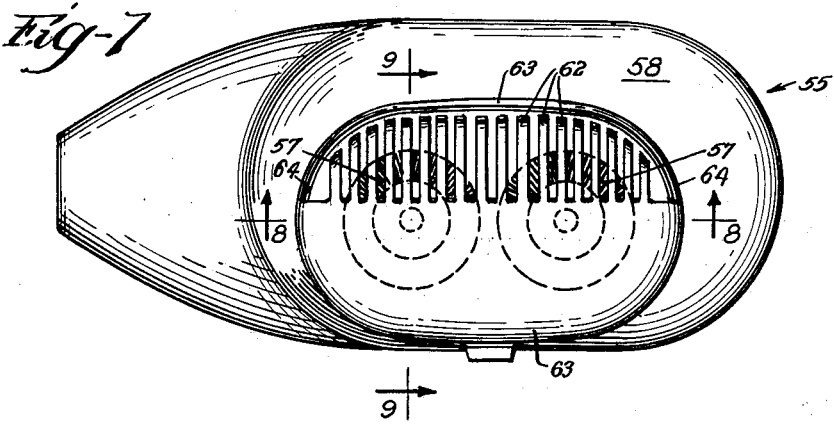
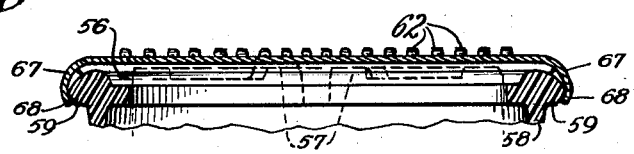
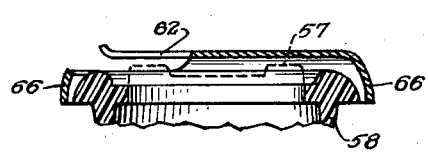
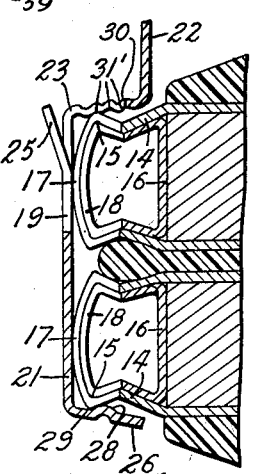
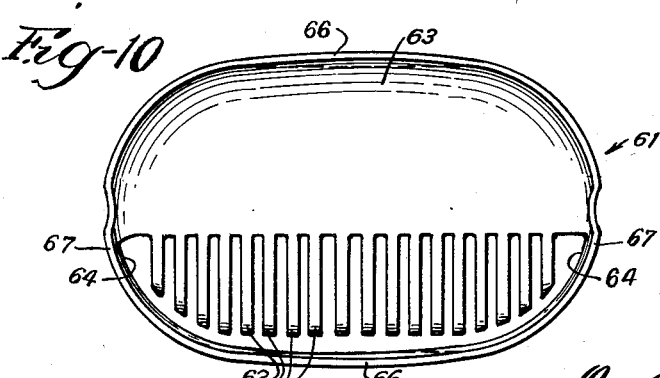
INVENTOR.
Orville S. Caesar
BY
Brown, Jackson, Boettcher & Brenner
Att'ys Oct. 22, 1963   O. S. CAESAR   3,107,423
ELECTRIC SHAVERS
Filed March 27, 1959   5 Sheets-Sheet 3
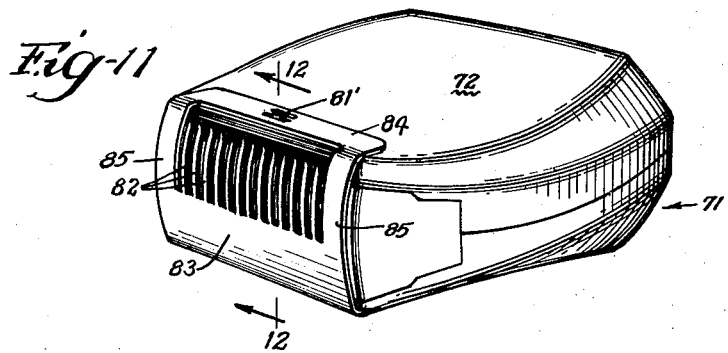
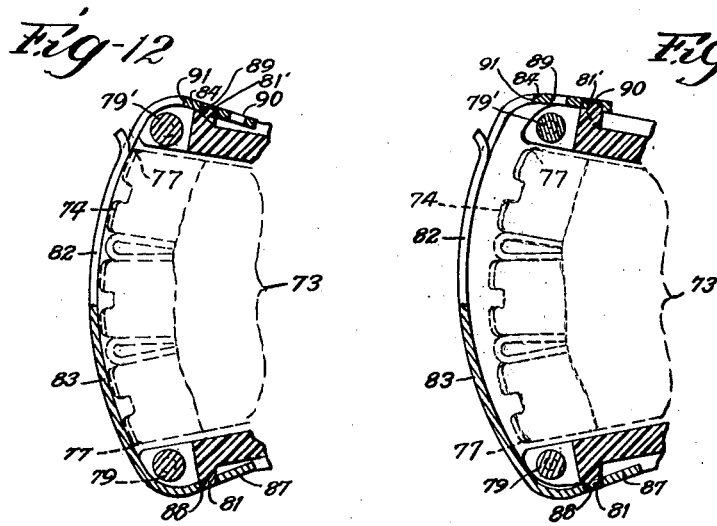
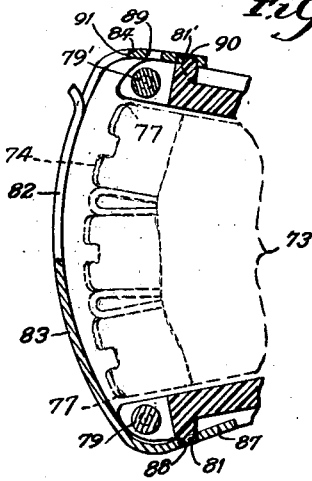
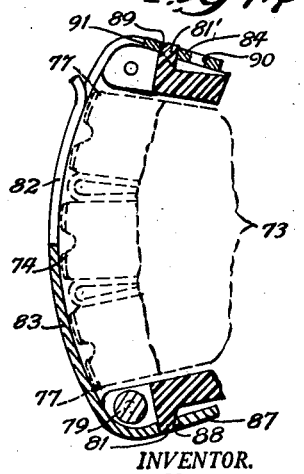
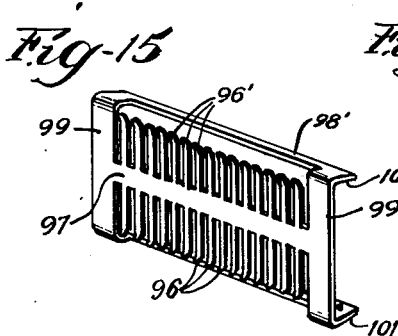
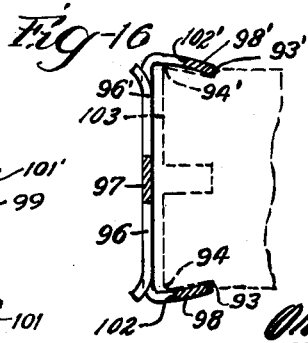
INVENTOR.
Orville S. Caesar
BY
Brown, Jackson, Boettcher & Dienner
Attys.

Oct. 22, 1963   O. S. CAESAR   3,107,423
ELECTRIC SHAVERS
Filed March 27, 1959   5 Sheets-Sheet 4
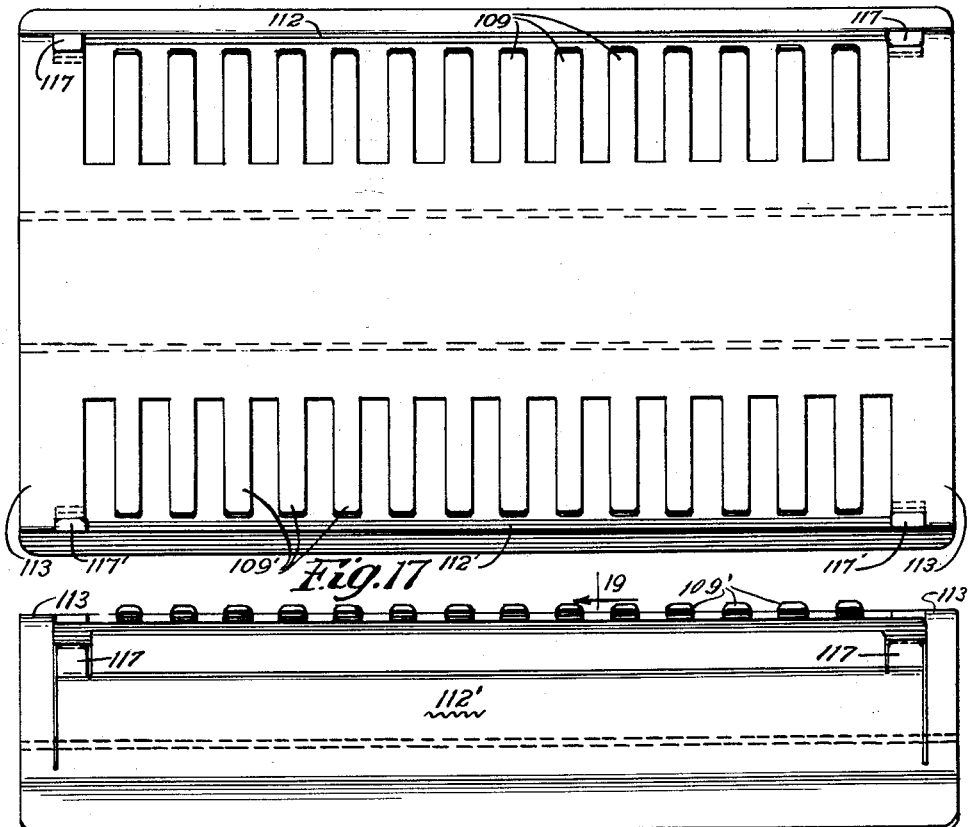
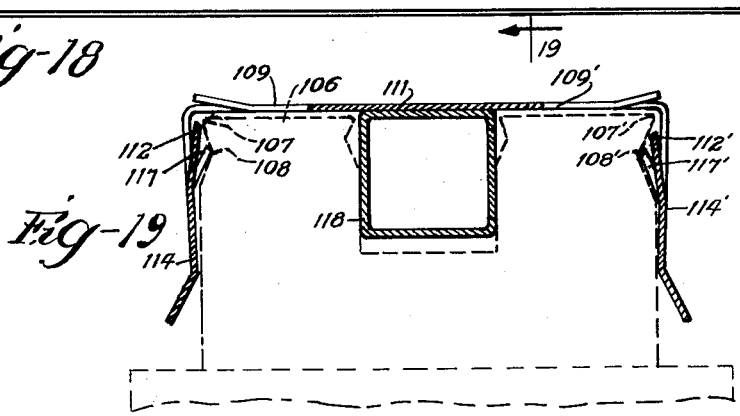
INVENTOR.
Orville S. Caesar

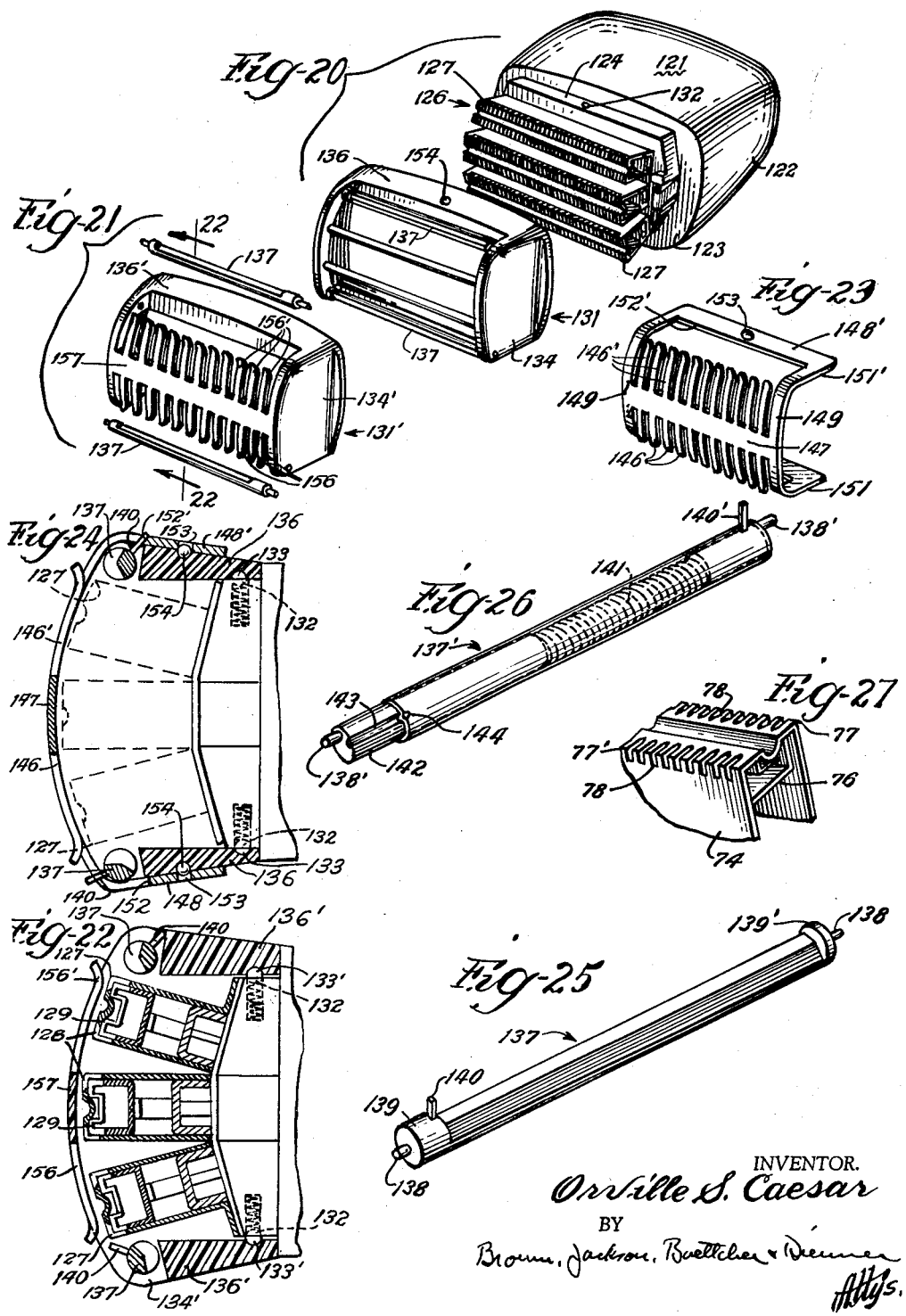

United States Patent Office 3,107,423
Patented Oct. 22, 1963

3,107,423
ELECTRIC SHAVERS
Orville S. Caesar, Box 51, 316 E. Lake, Barrington, Ill.
Filed Mar. 27, 1959, Ser. No. 802,426
14 Claims. (Cl. 30—90)

This invention relates generally to hair cutting devices and is concerned more particularly with means involving the use of conventional electric razors or so-called dry shavers for shaving and for trimming one's own hair.

It is an object of the invention to provide an electric razor or dry shaver having adjustable means associated with the cutting head for controlling entry of hair into the cutting head.

Another object of the invention is to provide a device which may be detachably secured to commercial types of electric razors adapting them to perform a hair trimming operation in a controlled manner.

A further object is to provide a novel combination of an electric razor and a device of the character described in the foregoing objects affording a degree of adjustability of the device with respect to the cutting head of the razor enabling the user to exercise control over the volume and depth of cut effected by the razor.

An additional object is to provide a hair-trimming attachment for electric razors which is simple in construction, efficient and reliable in operation, and inexpensive to manufacture.

Other objects and advantages of the invention will be apparent from the following description thereof, taken in connection with the accompanying drawings illustrating several embodiments of the invention.

In the drawings:

FIGURE 1 is a perspective view of a conventional electric razor having one embodiment of the present hair-trimming attachment secured thereto, a portion of the latter being shown broken away;

FIGURE 2 is a sectional view taken on line 2—2 of FIGURE 1 showing the attachment in one of several adjustable positions relative to the razor;

FIGURE 3 is a sectional view similar to FIGURE 2, showing the attachment in another of its adjustable positions relative to the razor;

FIGURE 4 is a top plan view of the hair-trimming attachment shown in FIGURES 1-3;

FIGURE 5 is a perspective partial bottom view of the attachment illustrated in FIGURE 4;

FIGURE 6 is a view, similar to FIGURES 2 and 3, of a modification of the attachment, illustrating another mode of adjustment of the attachment to a razor;

FIGURE 7 is a plan view of a further embodiment of the hair-trimming attachment mounted on an electric razor of the type having two circular cutters operating in a plane in the cutting head of the razor;

FIGURE 8 is a partial sectional view taken on line 8—8 of FIGURE 7, looking in the direction of the arrows, parts of the razor being shown in outline and in broken lines;

FIGURE 9 is a partial sectional view taken along line 9—9 of FIGURE 7, looking in the direction of the arrows;

FIGURE 10 is a bottom plan view of the hair-trimming device shown in FIGURES 7-9;

FIGURE 11 is a perspective view of another type of electric razor showing a further embodiment of the hair-trimming attachment secured thereto;

FIGURE 12 is a partial sectional view taken on line 12—12 of FIGURE 11, looking in the direction of the arrows, parts of the razor being shown in outline and in broken lines;

FIGURE 13 is a view similar to FIGURE 12, showing the hair-trimming attachment in a different position relative to the cutting head of the razor;

FIGURE 14 is a view similar to FIGURE 12 but with one of the parts of the razor removed;

FIGURE 15 is a perspective view of an additional embodiment of a hair-trimming attachment in accordance with the invention;

FIGURE 16 is a sectional view illustrating the hair-trimming attachment of FIGURE 15 secured to an electric razor, the latter being shown only partially and in broken lines;

FIGURE 17 is a top plan view, greatly enlarged, of an additional embodiment of a hair-trimming attachment of the invention;

FIGURE 18 is a side elevational view of the device shown in FIGURE 17;

FIGURE 19 is a sectional view taken on the line 19—19 of FIGURE 18, shown in position on the cutting head of an electric razor, the latter being shown only in outline in broken lines;

FIGURE 20 is an exploded perspective view of another form of razor with which the invention may be used;

FIGURE 21 is an exploded perspective view of a modification of a portion of the exterior casing of the razor shown in FIGURE 20, illustrating a further form of the invention;

FIGURE 22 is a transverse sectional view of the casing portion of FIGURE 21 positioned on the razor body shown in FIGURE 20, the view being taken substantially on a line 22—22 of FIGURE 21;

FIGURE 23 is a perspective view of a further embodiment of the hair-trimming attachment of the invention;

FIGURE 24 is a transverse sectional view, similar to FIGURE 22 of the razor of FIGURE 20, carrying the hair-trimming attachment of FIGURE 23;

FIGURE 25 is a perspective view of one form of hair-guide member used in the present hair cutting device.

FIGURE 26 is a perspective view of a modified form of the hair-guide member;

FIGURE 27 is a fragmentary perspective view of one form of cutting head of an electric razor used in the invention.

Referring first to the drawings in general, it will be seen that the invention is concerned, in part, with a hair-guide portion disposed adjacent at least one side of the cutting head of an electric razor and capable of vertical adjustment with respect to the cutting head so that the amount of hair entering the cutting head may be controlled. By this means the cutting action of the razor may be adjusted to permit light, medium, or heavy cutting of the beard in normal shaving operations. It will also be seen that the invention contemplates a novel form of comb member which, when attached to an electric razor or dry shaver, enables the user to trim his own hair. When the comb member is used in conjunction with a dry shaver having a hair-guide portion, as aforementioned, the latter cooperates with the comb member in controlling the length of hair-ends severed in the trimming operation. An alternate form of the invention contemplates a hair-trimming attachment for dry shavers having both a comb member and a hair-guide portion in a single assembly. Conveniently, the hair-trimming attachment is shaped to conform substantially to the profile of the cutting head of the electric razor with which it is to be used, and the razor and the attachment are provided wtih cooperating attaching means, e.g., detents and keeper seats, whereby the hair-trimming attachment may be snapped onto the razor body and held there by resilient cooperation between the attaching means.

Referring now particularly to FIGURES 1-6, there is shown a hair-trimming attachment 10, in accordance with the invention, secured by means to be more fully described hereinafter to a conventional electric razor, shown generally as 11, having a handle or main body portion 12 and a cutting head 13 of conventional construction, the cutting head comprising a pair of stationary outer elements 14 having exterior cutting edges 15 and interior cutting edges 15′, and movable inner elements 16 telescoped or nested within the outer elements 14. The outer element of the cutting head is provided with a plurality of slots 17 in its top surface, which constitutes the skin-contacting face of the cutting head, the slots 17 extending a short distance down its sides, as shown in elevation in FIGURES 2, 3 and 6, and the inner element 16 includes a plurality of cutting bars, one of which is shown as 18 in FIGURES 2, 3 and 6 which, by reciprocating longitudinally in contact with the outer element 14, sever any hairs which project through the slots 17.

As shown in the embodiment of FIGURES 1–6, the hair-trimming attachment 10 is fabricated in the form of a comb member having a plurality of teeth 19, surrounded by a frame or border portion having sides 21, 22, and ends 23, defining an opening 24. The teeth 19 are integral with, or attached to, the side 21 and extend partially across the opening 24 in the direction of the opposite side 22 of the frame portion, the free ends of the teeth preferably being upturned above the surface of the frame portion, as shown at 25, and being spaced from the side 22 of the frame portion.

The hair-trimming attachment 10 is conveniently fabricated from stiff resilient sheet material, such as sheet steel although other materials, such as certain well-known plastics (e.g., nylon, phenol-formaldehyde condensation polymerization products) may be used if desired. As used herein the term "sheet material" is intended to include not only conventional metallic sheet material, but also synthetic resin or plastic materials, whether the attachments of the invention are actually stamped from sheets thereof or produced by a molding operation. In the embodiment of FIGURES 1–4, the sides 21 and 22 of the frame portion are formed with flanges 26, 27 which function as fastening members to secure the comb member to a shaver, as will appear more fully below. The flange 26 depends from the side 21 and is formed with a longitudinal detent rib 28; the flange 27 is in the form of a tongue directed inwardly of the side 22 of the frame portion. The flange 27 is seen to comprise a portion of the entire flange formed by striking downwardly the portions of the ends 23 adjacent the free end of the comb teeth, after which the length of such entire flange between the ends 23 is struck inwardly.

As shown in FIGURES 2 and 3, the razor is indented beneath the exterior cutting edges 15 providing a shoulder or bevel on each side of the cutting head and the indented portion on one side of the cutting head is provided with a plurality of vertically aligned, spaced keeper seats or grooves 31. The identation adjacent one of the cutting edges 15 serves as a keeper for the detent 28, and the keeper seats 31 adjacent the opposite cutting edge 15 selectively accommodate the edge of the flange 27 acting as a detent, whereby the hair-trimming attachment is resiliently secured to the razor with the teeth 19 of the comb portion in overlying relation with respect to the cutting head 13, the comb teeth terminating adjacent the flange 27.

The flange 27 acts as a hair-guide for controlling the position of the hair passing across the cutting head 13, and it will be seen that the depth and amount of hair introduced to the cutting head may be predetermined by placing the edge of the flange 27 in the desired keeper seat 31. It will be understood that the keeper seats 31 need not, and preferably should not, extend over the entire length of the cutting head, but are preferably merely short grooves at both ends of the cutting head positioned outwardly of the functional portion of the stationary outer element 14 as defined by the slots 17. If desired, the detent and keeper-seat arrangement may be reversed, i.e., corresponding keeper seats 31′ may be formed in the dependent portions of the ends 23 of the frame portion for accommodating suitable detents provided at the ends of the cutting head, as shown in FIGURE 6. In such alternative construction a tongue detent, such as the flange 27 of FIGURES 2 and 3, may be omitted, and its described hair-guiding function will be provided by the inner edge or margin 30 of the side 22.

In operation, the razor with the hair-trimming attachment secured thereto is simply moved across the scalp with the comb member moving through the hair in the same way that an ordinary comb is used. The upturned ends 25 of the comb teeth maintain the cutting head of the razor spaced the desired distance from the scalp. The edge of the flange 27, acting as a hair-guide, controls the extent to which the hair ends may enter the slots 17 of the stationary outer element 14 of the cutting head, where they are severed by the cutting bars 18 of the inner element 16 reciprocating relatively to the outer element of the cutting head. When a fine trim is desired the attachment 10 is secured to the razor with the edge of the flange 27 in one of the upper keeper seats 31, as shown in FIGURE 2. For coarser hair trimming, the edge of the flange 27 is lodged in one of the lower keeper seats 31, as illustrated in FIGURE 3. In the modification of FIGURE 6, the inner edge or margin 30 of the side 22 may similarly be positioned at different distances from the top of the cutting head by selection of the particular keeper seat 31′ for engagement by the above mentioned detent at the ends of the cutting head.

In FIGURES 7–10 a further embodiment of the hair-trimming attachment is shown as applied to a conventional electric razor 55 of the type in which the cutting head 56 comprises a pair of circular cutting units 57, each of which comprises a stationary circular outer element and a movable circular inner element rotatable about a vertical axis relative to the outer element.

The portion of the handle or main body 58 of the razor 55 surrounding the cutting head is provided adjacent the opposite ends of the cutting head with bevels or shoulders 59 adapted to cooperate with means on the hair-trimming attachment, now to be described, for securing the latter to the razor. The trimming attachment is shown generally as 61 and, as in the modifications previously described, is fabricated generally in the form of a comb member having teeth 62 surrounded by a frame portion having sides 63 and ends 64.

The sides 63 are provided with depending flanges 66 and the ends 64 are provided with depending flanges 67, all of said flanges merging with one another to form a continuous flange member surrounding the teeth 62. The flanges 67 have inwardly directed edges 68 adapted to engage the shoulders 59 for resiliently securing the comb member to the razor body.

As shown in FIGURE 9, the flanges 66 are not adapted normally to contact the adjacent portions of the razor when the comb member is secured to the razor body but, rather, are spaced from the razor body. With this arrangement the comb member may be easily removed from the razor simply by manually depressing the flanges 66 (as shown in dotted lines in FIGURE 10), this action causing the flanges 67 to extend outwardly from the frame portion, thus disengaging them from the shoulders 59.

In the embodiment shown in FIGURES 11–14, a hair-trimming attachment of the invention is illustrated in combination with still another type of commercial electric razor shown generally as 71 having a main body or handle portion 72 supporting a cutting head 73 at one end thereof. The cutting head 73 (see FIGURE 27 for detail) comprises a stationary outer element 74 providing an outer skin-contacting face, and a movable inner element 76 similar, respectively, to the elements 14 and 16 previously described and, accordingly, the cutting head is shown only in outline in FIGURES 12–14. It will be seen from FIGURE 27, however, that the outer element 74 has exterior and interior cutting edges 77 and 77′, respectively, provided with slots 78 through which hair may pass and be cut by the movable inner element 76. In the convention used herein, the exterior cutting edges are those at the outer extremities of the cutting head, while the interior cutting edges are those disposed within the general border of the cutting head.

Adjacent the exterior edges 77 of the cutting head 73 are rollers 79, 79′ pivotally mounted in the main body portion of the razor substantially parallel to the upper surface of the cutting head, and with the uppermost element of the rollers slightly lower than the respective cutting edges 77, the rollers being supported at their ends by conventional journals (not shown), at least one of which is retractable, permitting removal of the rollers from the razor body. The main body portion of the razor is provided adjacent the rollers 79, 79′ with lugs or detents 81, 81′ (FIGURES 12–14), or equivalent detent means, for securing to the razor an embodiment of the hair-trimming attachment of the invention now to be described.

The hair-trimming attachment shown in FIGURES 11–14 is similar in construction to that previously described, it likewise being fabricated in the general form of a comb having teeth 82 surrounded by a frame or border portion having sides 83, 84 and ends 85. The comb member as a whole is shaped to conform to the profile of the portion of the shaver containing the cutting head and is so constructed, as in the embodiments described above, that the upper surface of the comb teeth over the major portion of their length form substantially an interrupted projection of the surfaces of the parts 85 of the frame portion bordering the sides of said teeth. The central portion of the comb member is shaped generally to conform in transverse cross-section to the shape of the cutting head 73, and the side 83 of the frame portion is provided with a depending flange 87 having an aperture 88 which acts as a keeper for the lug or detent 81. The opposite side 84 of the comb member is also bent or otherwise formed so that it also forms a depending flange which resiliently contacts the lug or detent 81′ when the comb member is secured to the razor. The comb member is thus seen to be generally channel-shaped, whereby the comb member may be telescoped over the portion of the shaver containing the cutting head, when securing the comb member to said shaver. The comb teeth are formed in the web or central portion of the channel-shaped comb member, and the two flanges function as fastening members whereby the comb member is secured to the razor. The side 84 of the frame portion is in the form of a wall member over which the hair moves when the comb member is moved across the scalp in a hair trimming operation and is provided with apertures 89, 90 which act selectively as keepers for the detent 81′, whereby the teeth 82 of the comb member, and the inner edge or margin 91 of the side 84, may be held in several positions relative to the cutting edge 77. The comb teeth 82 terminate laterally inwardly relative to the side 84, leaving an unobstructed opening between the side 84 and the free ends of the comb teeth, the opening being laterally coextensive with said comb teeth.

The inner margin 91, which constitutes a hair-engaging portion of the side 84, is disposed below the comb teeth and defines a continuous straight line substantially perpendicular to the direction of the comb teeth 82 and substantially parallel to the surface of the frame portions 85 bordering the sides of the comb teeth, and it will be seen by inspection of FIGURES 11–14 that hair-trimming cuts of varying degrees of coarseness may be obtained by adjusting the comb member relative to the cutting head 73, and by removing the roller 79′. When the comb member is attached to the shaver as shown in FIGURES 11–14, the comb teeth 82 are positioned in overlying relation with respect to the cutting head 73, and the inner margin or edge 91 of the side 84 of the frame portion is disposed parallel to the top of the cutting head and below the adjacent cutting edge 77. When the detent 81′ is position in the aperture 89 of the frame member, as shown in FIGURE 12, the roller 79′ functions as the primary hair-guide and, the roller being disposed somewhat below the cutting edge 77, permits an appreciable length of the hair-ends to enter the slots 78 of the cutting head where they are severed. On the other hand, when the comb member is in the position shown in FIGURE 13, with the detent 81′ reposed in the aperture 90, the edge 91 is disposed at about the same level as the top of roller 79′ and exerts a hair guiding action which modifies that of the roller 79′, whereby a shorter length of the longer hair ends is severed, resulting in a finer trim. When the roller 79′ is removed entirely from the razor and the detent 81′ is positioned in aperture 89, as shown in FIGURE 14, the guide edge 91 exerts very little restraint on the ends of the hair, permitting them to enter deeply into the cutting head, resulting in a coarse trim. Raising the comb member in FIGURE 14 by placing the detent 81′ in the aperture 90 of course raises the hair-guide edge 91, whereby a finer trim is effected. Also, as the comb teeth are correspondingly raised and lowered by the adjustments just described in connection with FIGURES 11 to 14, correspondingly longer and shorter lengths of the hair above the scalp may reach the cutting head of the shaver, thereby further affecting the length of the hair severed during a trimming operation.

In FIGURES 15 and 16 a further embodiment of the present hair-trimming attachment is shown as applied to an electric razor having a cutting head comprising stationary outer elements including exterior cutting edges, and movable inner elements similar to those described in connection with FIGURES 11–14 and 29. Accordingly, the razor body is shown only in outline form in broken lines, and its details will not be described except to the extent of mentioning that the cutting head, or the razor body adjacent the cutting head, is necked in, as shown at 93, 93′ below the cutting edges 94, 94′. The trimming attachment of FIGURES 15 and 16 is fabricated in the form of a comb member having two sets of teeth 96, 96′ projecting outwardly from a supporting bar or element 97 secured to or integral with a frame portion surrounding the comb teeth. The frame portion is defined by sides 98, 98′ and ends 99, the frame being formed so that the sides 98, 98′ are contained in dependent flanges 101, 101′. The flanges also include the inner margins 102, 102′ of the sides 98, 98′, the margins 102, 102′ being disposed at unequal distances below the comb teeth.

As shown in FIGURE 16, the flanges are directed slightly inwardly from the perpendicular to the top of the comb member whereby to grip tightly against the necked portions 93, 93′ of the razor and thereby to hold the comb member resiliently in place on the cutting head 103. When the comb member is secured to the razor, the inner margin 102 is disposed only slightly below its adjacent cutting edge 94, while the inner margin 102′ is disposed a greater distance below its adjacent cutting edge 94′. Thus, the inner margins 102, 102′ constitute hair-guide portions for controlling passage of hair into the slots of the cutting head, whereby fine trimming is obtained when the razor is applied to the hair with comb teeth 96 in advance, while a coarser trim is obtained when the razor is applied with the comb teeth 96′ in the forward position.

The embodiment illustrated in FIGURES 17–19 is shown as applied to a razor having a cutting head 106 which also comprises a stationary outer element including exterior cutting edges 107, 107′ and a movable inner element, similar to that described in connection with FIGURES 11–14, and 27. Accordingly, the razor portion including the cutting head is shown only in outline form in broken lines, from which it will be evident that the cutting head is necked in below the cutting edges, as shown at 108, 108'. The trimming attachment of this modification is also fabricated in the form of a comb member having two sets of teeth, 109, 109' projecting outwardly from a supporting element or bar 111 secured to or integral with a frame portion surrounding the teeth. The frame portion is defined by sides 112, 112', and ends 113, the frame being formed so that the sides 112, 112' are contained in dependent flanges 114, 114'. The sides 112, 112' are fabricated as inwardly directed flaps or tongues, the tops of which rest against the cutting head adjacent the cutting edges 107, 107' and constitute hair-guide edges for controlling the depth and amount of hair entering the cutting head, in the manner previously described in connection with the embodiment of FIGURES 11–14.

The extreme ends of the sides 112, 112' are formed respectively with short inwardly directed ears 117, 117' which rest within the necked portions of the razor adjacent the ends of the cutting head. If desired, a transverse reinforcing bar or rib 118 may be fixed to or formed integral with the comb portion below the supporting element 111.

It will be seen from FIGURE 19 that the height of side 112 is somewhat greater than that of side 112' so that the top edge of the former rests just below the cutting edge 107, while the top edge of the side 112' rests somewhat farther below the cutting edge 107', whereby the two cutting edges are adapted to take cuts of different degrees of fineness during a hair-trimming operation, as previously described.

In the embodiments of the invention shown in FIGURES 20–24 the dry shaver employed comprises a main body or handle portion 121 having an exterior casing 122 terminating in a shoulder 123 surrounding a boss 124 which carries a cutting head 126 having exterior cutting edges 127, and including stationary outer elements 128 and movable inner elements 129 (FIGURE 22), as previously described. A cap or collar portion 131, which also constitutes a portion of the shaver casing, includes an exterior wall portion positioned outwardly of the sides of the cutting head, surrounding the latter, and, after the collar 131 has been telescoped over the above-mentioned cutting head and boss, it is held in place against the shoulder 123 by any convenient means, as by a ball detent 132 in the boss 124, resting in a keeper seat 133 in the cap portion.

The cap or collar portion 131 is of generally cylindrical tubular conformation having end walls 134 and side walls 136, the end walls extending slightly above the upper surface of the cutting head and the side walls terminating below the upper surface of the cutting head. The tops of the side walls 136 may themselves constitute hair-guide portions for controlling entry of hair into the cutting head, in the manner of the inner margins 102, 102' of the attachment shown in FIGURES 15, 16; however, a conventional wall per se is not necessary for providing a hair-guiding function since wall-like structures generally, over which the hair is made to pass, may provide such hair-guide functions just as well. Accordingly, in the preferred construction of the present embodiment, separate wall means functioning as hair-guide portions are provided which are supported between end walls 134 and overlie the tops of the side walls 136. In FIGURE 20 the wall means functioning as the hair-guide portions are shown as bars or rods 137 which are non-circular in cross-section and are pivotally mounted at their ends in the end walls 134 and are spaced from the side walls 136 and from the respective adjacent sides of the cutting head. An enlarged detail of a suitable form of guide rod is shown in FIGURE 25. In an alternative form, the guide rod may be substantially circular in cross-section, but pivotally mounted eccentrically in the end walls. This alternative form is shown as 137' in FIGURE 26.

Referring briefly to FIGURE 25, the hair-guide member 137 there illustrated is substantially semi-circular over substantially its entire length and its pivots 138 are concentric with short circular lengths 139, 139' preserved at the ends of the rods. A small knob 140 is provided at one end of the guide rod to facilitate its rotation on its pivot, as will be described in more detail hereinafter.

The guide rod 137' shown in FIGURE 26 is substantially circular in cross-section, and carries pivots 138' eccentrically in the ends thereof for mounting in suitable bearings in the end walls 134 of the cap portion. A knob 140' is also provided near one end of the rod 137'.

The guide rods 137, 137' are preferably not freely rotatable in their mountings in order that they may be maintained in predetermined fixed positions relative to the cutting edge of the shaver during a shaving or hair-trimming operation. To this end the guide rods may be fabricated from a wear-resistant plastic material, such as nylon or other suitable material, and of such length that their ends bear tightly against the end walls 134 of the cap portion. Alternatively, as shown in FIGURE 26, the rod may be hollow over a portion of its length to accommodate a compression spring 141 which bears against a telescoping end piece 142 carrying one of the pivots 138'. To maintain the pivots 138' in proper alignment, the end piece 142 may be provided with a key groove 143 which receives one end of a pin 144 carried by the wall of the main portion of the rod 137'. Other means may obviously be resorted to for retarding rotation of the guide rods in their mountings.

A hair-trimming attachment which is adapted to be secured to the dry shaver of FIGURE 20, in accordance with the invention, is shown in FIGURE 23 where it will be seen that the attachment comprises a comb member similar to that illustrated in FIGURES 15 and 16, having two sets of teeth 146, 146' projecting outwardly from a solid supporting bar or element 147 secured to or integral with a frame portion surrounding the comb teeth. The comb teeth 146, 146' are of such a length that the free ends of each set terminate over the respective exterior cutting edge 127 of the dry shaver to which it is adapted to be attached (FIGURE 24). The frame portion is defined by sides 148, 148' and ends 149, the sides being incorporated in depending flanges 151, 151', which include the inner margins 152, 152' of the sides 148, 148' disposed below the surface of the comb teeth. The sides 148, 148' are also provided with apertures or other keeper seats 153 which accommodate ball detents 154 on the cap portion when the comb member is secured to the cap portion 131.

FIGURE 24 represents a cross-sectional view of the dry shaver of FIGURE 20 having the hair-trimming attachment of FIGURE 23 secured to the cap portion thereof. It will be seen from FIGURE 24 that the guide portions 137 may be adjusted by rotating them in their mountings so that the uppermost element in their non-circular surfaces may be disposed at various levels relative to the cutting edges 127. For example, one of the hair-guide bars 137 is shown in FIGURE 24 with its uppermost element at a considerable distance below the adjacent cutting edge 127, while the other guide bar 137 is shown with its uppermost element only slightly below the adjacent cutting edge 127. With the guide bars in these positions, the assembly of FIGURE 24 will perform a rather fine trimming cut when the comb teeth 146 are in the advance position during the hair-trimming stroke, and will perform a coarser trimming cut when the teeth 146' are in the advance position during the hair-trimming stroke.

FIGURE 21 is an exploded perspective view of a further modification of the invention in which a cap or collar portion 131', which is adapted to be secured to a dry shaver body such as that shown in FIGURE 20, in place of cap portion 131, carries a comb member permanently secured thereto, or integral therewith. As with the cap portion 131, the cap portion 131' is of generally cylindrical tubular conformation having end walls 134' and side walls 136', the end walls being adapted to extend slightly above the cutting head of the dry shaver to which it is attached, while the side walls 136' terminate below the upper surface of the cutting head of the shaver. Keeper seats 133' (FIGURE 24) are provided in the side walls of the cap or collar portion 131' for receiving the ball detents 132 of the shaver body when the cap portion is secured thereto (FIGURE 22). Hair-guide portions of any suitable construction are carried by the cap portion 131' below the comb teeth, and in the embodiment of FIGURE 22 the hair-guide portions comprise wall means in the form of guide bars 137 having setting knobs 140, previously described. The guide bars 137 are pivotally mounted at their ends in end walls 134', and are disposed in a position overlying the tops of the side walls 136' of the cap portion.

The comb member of the cap or collar portion 131' comprises two sets of teeth 156, 156' disposed in the opening of the collar portion at the upper end of the opening and projecting outwardly from a support element or bar 157 extending between the upper ends of the end walls 134' and integral therewith. As with the embodiments previously described, the comb teeth are surrounded by a frame or border portion, and in the instant embodiment the said frame or border portion comprises the opposed end walls 134' and the composite opposed side wall means comprising the wall portions 136' and the respective hair-guide portions 137 disposed over such walls 136'. The comb teeth extend respectively in the direction of the opposite longitudinal sides of the collar portion and are of a length insufficient to project beyond the said respective composite wall means 136', 137. The two sets of comb teeth also extend respectively substantially to the exterior cutting edges 127 of the shaver. FIGURE 22 is a cross-sectional view of the cap portion of FIGURE 21 when secured to the shaver body of FIGURE 20, and it will be seen that the several parts of the combination function in substantially the same manner as the combination shown in FIGURE 24.

Inasmuch as most electric shavers of the reciprocating-cutter type have several cutting units (each with its own inner and outer elements), and consequently have cutting edges both at the outer extremities of the cutting head and within its general border, as shown for example in FIGURES 2 and 12, it is to be understood that, as used in the claims, the term "cutting edge" refers to a cutting edge at the outer extremity of the cutting head (i.e. a cutting edge which is not opposed by another cutting edge of an adjacent cutting unit), as mentioned in the discussion of FIGURES 11–14 above .

In all of the embodiments of the invention described above in which a comb member is used in conjunction with a dry shaver, the shaver is moved along the scalp with the comb member in contact with or adjacent the scalp in the manner of an ordinary comb. As the hair-ends move past the cutting head, some of them project through the slots or openings in the stationary outer element thereof and are severed by the action of the movable inner element which rotates or reciprocates under the outer element. The hair-guide members adjacent one or both sides of the cutting head and carried either by the comb member or by the shaver body, are effective to control the passage of hair over the cutting edge, thereby affecting the length of the hair-ends severed during a hair-trimming operation, and adjustment of the hair-guide members relative to the cutting head affords control over the coarseness of the cut. In those embodiments wherein the hair-guide member is mounted on the shaver itself, the guide members (e.g., guide bars 137 and 137') function to control the length of the hair-ends entering the cutting head during a normal shaving operation, the comb member of course being omitted during such use of the shaver.

From the foregoing description, the construction and operation of the various embodiments of the invention will be readily understood and further explanation is believed to be unnecessary. It is to be understood that the invention is not limited to the exact construction shown and described, since numerous modifications and changes will readily occur to those skilled in the art within the scope of the appended claims.

What I claim is:

1. A hair-trimming attachment for an electric razor including a cutting head having outwardly opposed cutting edges, comprising a comb member including two sets of teeth projecting respectively outwardly from a supporting element carried by a frame portion surrounding said teeth, said frame portion having dependent flanges on the sides thereof parallel to said supporting element, said flanges being adapted to fit over a portion of an electric razor to position said teeth in overlying relation with respect to the cutting head of the razor, the inner margins of the sides of said frame portion which contain said flanges being disposed substantially in the plane of the latter and substantially parallel to the general plane of said teeth, said margins being formed at different distances below the said general plane of said comb teeth, and being adapted when said comb member is secured to said razor to be disposed below said respective cutting edges and situated respectively to control the position of hair passing into contact with the cutting head, and means on said flanges for detachably securing said frame portion to the razor.

2. An attachment for use with a power shaver including a cutting head having a cutting edge, comprising a comb member including a plurality of teeth surrounded by a frame portion defining an opening within its border, said teeth extending partly across said opening in the direction of one side of said frame portion, said comb member being shaped to conform substantially to the profile of the portion of said shaver containing said cutting head, said comb member being adapted to fit over said portion of said shaver in covering relation thereto and to be secured in that position to said shaver, said comb teeth being adapted to overlie said cutting head when said comb member is secured to said shaver, the upper surface of said comb teeth for the major portion of their length forming substantially an interrupted projection of the surface of the parts of said frame portion bordering the sides of said teeth, the inner margin of said one side of said frame portion being continuous and disposed below said teeth and parallel to lines running transversely of said teeth in the upper surface thereof, said inner margin being adapted when said comb member is secured to said shaver as aforesaid to be disposed parallel to the top of said cutting head and below said cutting edge, whereby said inner margin constitutes a hair-guide portion for controlling the position of hair passing into contact with said cutting head when said comb member is so secured to the shaver, and means for so securing said comb member detachably to said shaver.

3. An attachment for use with an electric shaver including a cutting head having a skin-contacting face and a cutting edge, comprising a comb member of resilient sheet material including comb teeth surrounded by a frame member having side and end portions, said comb member being shaped to conform substantially to the portion of said shaver containing said cutting head and being adapted to fit over said portion of said shaver in covering relation thereto and to be secured in that position to said shaver, said comb member having dependent flanges at said side portions which are adapted to extend below said skin-contacting face of said shaver when the comb member is secured to said shaver, said comb teeth being attached to one of said sides and terminating laterally inwardly relative to the side opposite said one side, said comb teeth being adapted to overlie said skin-contacting face when said comb member is secured to said shaver, said opposite side of said frame member lying within one of said flanges and the inner margin of said opposite side being continuous and disposed entirely below said comb teeth, said inner margin being adapted to be disposed below said cutting edge and situated to control the position of hair passing into contact with said cutting head when said comb member is secured to said shaver, and means for so securing said comb member to said shaver.

4. An attachment for a power shaver including a handle portion and a cutting head having a cutting edge mounted on said handle portion, comprising a collar portion adapted to be mounted on said handle portion in a position surrounding said cutting head, a comb portion integral with said collar portion and having comb teeth disposed in the opening of said collar portion at one end thereof, said comb teeth extending in the direction of one side of said collar portion and terminating laterally inwardly relative to said one side, said comb teeth being shaped to conform substantially to the profile of said cutting head and being adapted to overlie the latter when said collar portion is mounted on said handle portion, said collar portion including at the side thereof adjacent the free ends of said comb teeth a hair-guide element having a hair-engaging portion disposed below the free ends of said comb teeth and substantially parallel to lines running transversely of said comb teeth in the surface defined by said comb teeth, said hair-engaging portion being adapted to be disposed parallel to and below said cutting edge and situated to control the position of hair passing into contact with said cutting head when said collar portion is mounted on said handle portion, and means for so mounting said collar portion on said handle portion.

5. An attachment for a power shaver including a handle portion and a cutting head having a cutting edge mounted on said handle portion, comprising a collar member adapted to be mounted on said handle portion in a position surrounding said cutting head, a comb portion integral with said collar member and having comb teeth disposed in the opening of said collar member adjacent one end thereof, said comb teeth extending in the direction of one side of said collar member and terminating laterally inwardly relative to the outer surface of said one side of the collar member and in spaced relation to said one side, said comb teeth being shaped to conform substantially to the profile of said cutting head and being adapted to overlie said cutting head when said collar member is mounted on said handle portion, a hair-guide bar movably mounted on said collar member at said one side thereof below said comb teeth, said hair-guide bar being adapted to be disposed adjacent said cutting head and below said cutting edge and situated to control the position of hair passing into contact with said cutting head when said collar member is mounted on said handle portion, means for so mounting said collar member on said handle portion, and means for disposing the uppermost element of said hair-guide bar in one of a plurality of fixed positions relative to said comb teeth.

6. An attachment for use with an electric shaver including a cutting head provided with a cutting edge, comprising a collar member adapted to be mounted on said shaver in a position surrounding said cutting head, an eccentric hair-guide portion pivotally carried by two opposed walls of said collar member and extending therebetween and disposed above one of the other walls of said collar member, said hair-guide portion being adapted to be positioned adjacent said cutting head and parallel to and below said cutting edge and situated to control the position of hair passing into contact with said cutting head when said collar member is mounted on said shaver, a comb member extending between and supported by said first-mentioned opposed walls and having a plurality of comb teeth shaped to conform substantially to the profile of said cutting head, said comb teeth extending toward said hair-guide portion and being disposed above the latter, said comb teeth being adapted to overlie said cutting head with their free ends terminating adjacent to said cutting edge when said collar member is mounted on said shaver, means for so mounting said collar member on said shaver, and means for disposing said hair-guide portion in a plurality of fixed positions on its pivots, whereby the surface of said hair-guide portion is disposed selectively at different distances from said comb teeth.

7. An attachment for use with a power shaver including a cutting head provided with a cutting edge, comprising a comb member including a plurality of teeth surrounded by a frame portion defining an opening within its border, said teeth being supported by said frame portion and extending partly across said opening in the direction of one side of said frame portion, said comb member being shaped to conform substantially to the profile of the portion of the shaver containing said cutting head and being adapted to fit over said portion of said shaver in covering relation thereto and to be secured in that position to said shaver, said comb teeth being adapted to overlie said cutting head when said comb member is secured to said shaver, the inner margin of said one side of said frame portion being continuous and substantially straight and being disposed below said comb teeth and substantially parallel to lines running transversely of said comb teeth in the surface defined by said comb teeth, said inner margin being adapted to be disposed parallel to the top of said cutting head and below said cutting edge and situated to control the position of hair passing into contact with said cutting head when said comb member is secured to said shaver, and means for so securing said comb member to said shaver.

8. An attachment for use with an electric shaver including a cutting head provided with a cutting edge, comprising a comb member having a plurality of free-ended comb teeth and shaped to conform substantially to the profile of the portion of said shaver containing said cutting head, said comb member being adapted to fit over said portion of said shaver in covering relation thereto and to be secured in that position to said shaver, said comb teeth being adapted to overlie said cutting head when said comb member is secured to said shaver, said comb member also including wall means for guiding hair across which the hair is adapted to move when said comb member is moved across the scalp in a hair-trimming operation, said wall means being disposed adjacent the free ends of said comb teeth and being coextensive laterally with said comb teeth, the portion of said wall means proximate to said comb teeth comprising a hair-engaging portion, the latter being disposed below said comb teeth and spaced therefrom whereby an unobstructed opening is formed between said hair-engaging portion and the ends of said comb teeth, said hair-engaging portion being adapted when said comb member is secured to said shaver to be disposed below said cutting edge and situated to control the position of hair passing into contact with said cutting head, said wall means being movably mounted on said comb member for disposition in a plurality of fixed positions relative to said comb teeth, whereby said wall means may be disposed in any one of a plurality of fixed positions relative to said comb teeth and thereby vary the distance between said comb teeth and the hair-engaging portion of said wall means, and means for so securing said comb member to said shaver.

9. An attachment for use with an electric shaver including a cutting head provided with a cutting edge, comprising a comb member including a plurality of teeth surrounded by a frame portion defining an opening within its border, said teeth being supported by said frame portion and extending partly across said opening in the direction of one side of said frame portion, said frame portion having a substantially channel-shaped profile and including opposed depending flanges, the teeth of said comb member lying in the web portion of the channel and the said flanges being adapted to pass over opposed sides of the portion of said shaver containing said cutting head in securing said comb member to said shaver, whereby said comb teeth are adapted to overlie said cutting head when said comb member is secured to said shaver, said one side of said frame portion being included in one of said flanges, the inner margin of said one side of said frame portion defining a continuous substantially straight line parallel to lines running transversely of said comb teeth in the surface defined by said comb teeth and being disposed below and spaced from the latter, said inner margin being adapted when said comb member is secured to said shaver to be disposed below said cutting edge and situated to control the position of hair passing into contact with said cutting head, and means for so securing said comb member to said shaver.

10. In a hair trimming attachment for use with an electric shaver having a cutting head provided with a cutting edge, which attachment comprises a comb member having a plurality of free-ended comb teeth surrounded by a border portion and supported thereby, said comb teeth being adapted to overlie said cutting head when said attachment is secured to said shaver, said comb teeth extending in the direction of one of the sides of said border portion, said one side of said border portion and the opposed side of said border portion being adapted to telescope over the portion of said shaver containing said cutting head in securing said attachment to said shaver, said one side of said border portion including a continuous hair engaging portion adapted to be disposed below said cutting edge and situated to control the position of hair passing into contact with said cutting head when said attachment is secured to said shaver; the improvement which comprises providing said comb teeth of a length insufficient to project beyond said one side of said border portion and disposing said comb teeth in spaced relation with respect to said one side of said border portion, whereby an unobstructed opening is formed between said one side of said border portion and the free ends of said teeth.

11. In a hair trimming attachment for use with an electric shaver having a cutting head provided with a cutting edge, which attachment comprises a generally channel-shaped member having a plurality of comb teeth formed in the web portion thereof and flanges on opposite sides of said web portion adapted to fit over opposite sides of the portion of said shaver containing said cutting head when said attachment is secured to said shaver, the improvement which comprises providing an opening laterally coextensive with said comb teeth and extending from the ends of said teeth to a line in the flange adjacent the ends of said teeth, said line being substantially straight and coextensive laterally with said comb teeth and disposed below said comb teeth and adapted when said attachment is secured to the shaver to be disposed below said cutting edge and situated to control the position of hair passing into contact with said cutting head.

12. A hair trimming attachment for use with an electric shaver including a cutting head having a cutting edge, comprising a comb member for said shaver having a plurality of comb teeth formed therein and being shaped to conform substantially to the profile of the portion of said shaver containing said cutting head, said comb member also including wall means for guiding hair disposed adjacent the free ends of said comb teeth and below the latter, said wall means being movably mounted on said comb member, said comb member being adapted to fit over said portion of said shaver in covering relation thereto and to be secured in that position to said shaver, said comb teeth being adapted to overlie said cutting head when said comb member is secured to said shaver, wall means being continuous and substantially co-extensive laterally with said comb teeth, and including a hair-engaging portion adapted to be disposed parallel to the top of said cutting head and below said cutting edge and situated to control the position of hair passing into contact with the cutting head upon disposition of said comb member on said shaver, the position of said hair-engaging portion with respect to said comb teeth being adjustable upon movement of said wall means in its mounting.

13. A hair-trimming attachment in accordance with claim 7, wherein said means includes means on said comb member adapted to cooperate with means on said shaver for detachably securing said comb member to said shaver in one of several fixed positions to dispose said inner margin in corresponding fixed positions at different distances from said cutting edge.

14. A hair-trimming attachment in accordance with claim 9, wherein the portion of said one of said flanges which includes said one side of said frame portion is struck inwardly from the plane of the remainder of said one flange to form an inwardly directed flange containing said one side of said frame portion, said inwardly directed flange being adapted to resiliently abut said shaver in securing said frame portion to said shaver.

References Cited in the file of this patent

UNITED STATES PATENTS

| 2,155,299 | Broyles | Apr. 18, 1939 |
| 2,165,391 | Lewis | July 11, 1939 |
| 2,256,076 | Coles | Sept. 16, 1941 |
| 2,423,874 | Coles | July 15, 1947 |
| 2,539,011 | Denocenzo | Jan. 23, 1951 |
| 2,547,288 | Sandlie | Apr. 3, 1951 |
| 2,715,266 | Haislip | Aug. 16, 1955 |
| 2,734,266 | Schreyer | Feb. 14, 1956 |
| 2,749,613 | Miller | June 12, 1956 |
| 2,791,830 | Kluge | May 14, 1957 |
| 2,802,263 | Marchner | Aug. 13, 1957 |
| 2,807,876 | Barone | Oct. 1, 1957 |
| 2,826,812 | Haislip | Mar. 18, 1958 |
| 2,864,162 | MacDonald | Dec. 16, 1958 |
| 2,880,504 | Finn | Apr. 7, 1959 |
| 2,991,554 | Somers et al. | July 11, 1961 |

FOREIGN PATENTS

| 213,581 | Australia | Mar. 10, 1958 |